No. 783,261. PATENTED FEB. 21, 1905.
W. W. FULLER.
AIR BRAKE HANDLE.
APPLICATION FILED MAR. 8, 1904.
2 SHEETS—SHEET 1.
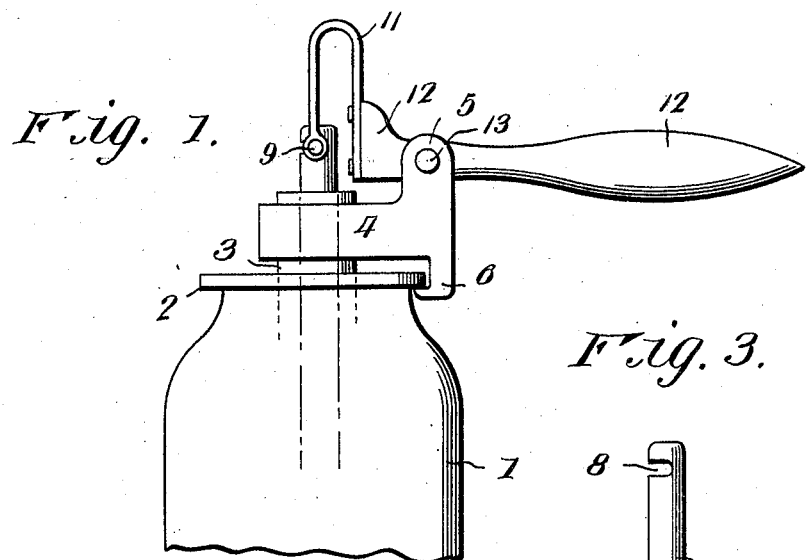
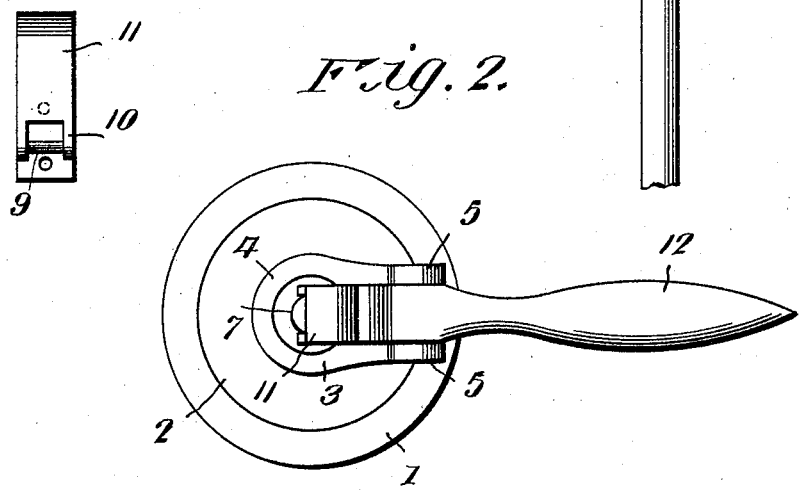
Inventor
W. W. Fuller.
Witnesses
By Victor J. Evans
Attorney

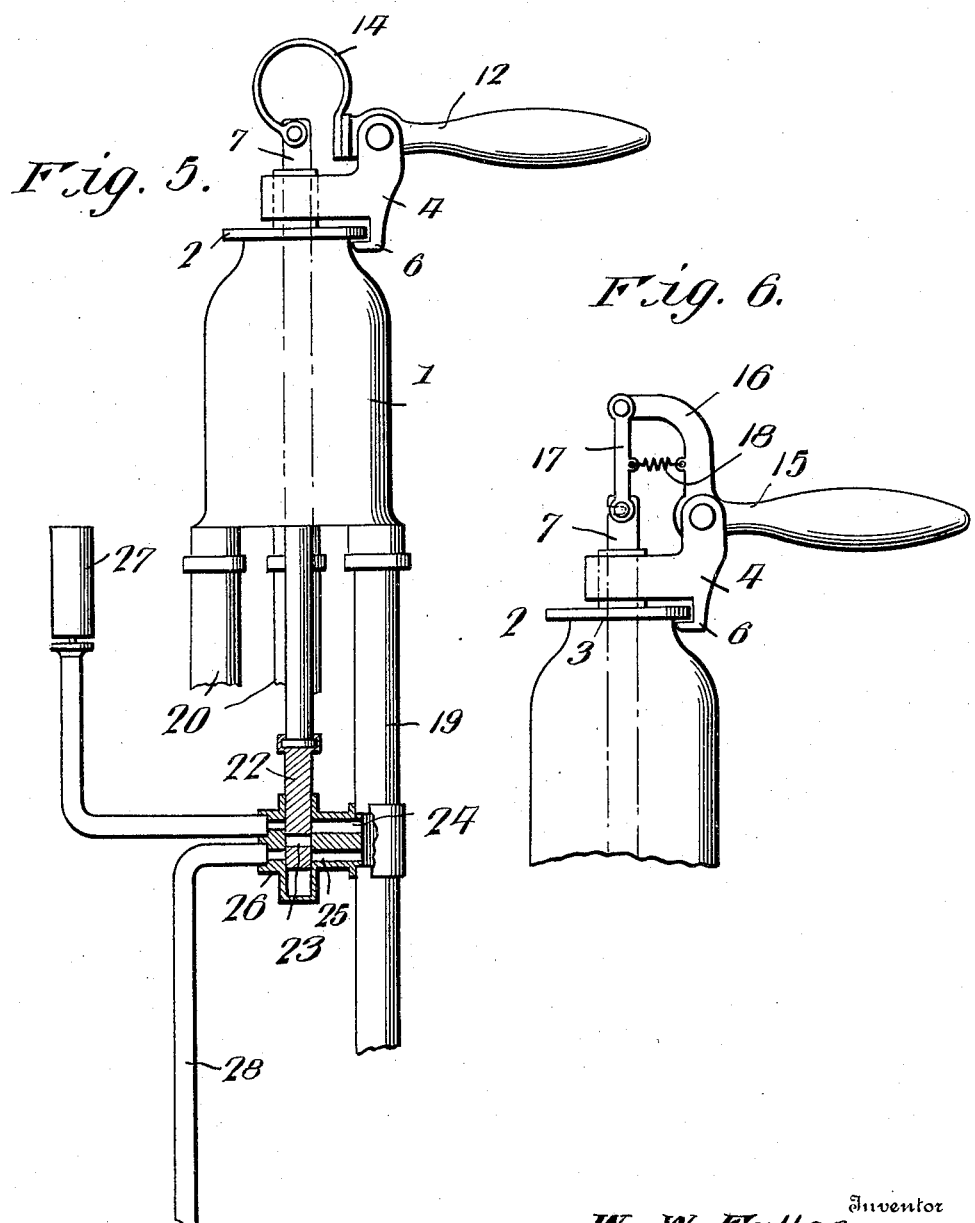

No. 783,261.

Patented February 21, 1905.

UNITED STATES PATENT OFFICE.

WALLACE W. FULLER, OF CHARLESTON, SOUTH CAROLINA.

AIR-BRAKE HANDLE.

SPECIFICATION forming part of Letters Patent No. 783,261, dated February 21, 1905.

Application filed March 8, 1904. Serial No. 197,163.

*To all whom it may concern:*

Be it known that I, WALLACE W. FULLER, a citizen of the United States, residing at Charleston, in the county of Charleston and State of South Carolina, have invented new and useful Improvements in Air-Brake Handles, of which the following is a specification.

My invention relates to new and useful improvements in operating-handles for use in connection with air-brake valves such as ordinarily employed upon electric cars.

The object of the invention is to provide a handle of simple construction which is adapted to be attached to any ordinary form of valve of this character and which is capable of four movements—to wit, to the right and left and upward and downward.

Another object is to so arrange the handle as to permit the same to apply and release the air-brakes and to operate a whistle, sand-box, or other devices by the upward and downward movement of the handle, respectively. Heretofore it has been necessary where air has been used for applying brakes upon electric cars to provide two or more valves, operated by as many handles, to apply or release the brakes and to operate a whistle or sand-box. By utilizing a handle such as invented by me, however, all of these operations can be performed by properly moving the one handle.

The invention consists of a rotary arm, which is connected to the mechanism of the air-brake valve, and by turning this arm in one direction the brakes are adapted to be applied and by reversing the operation of the arm the brakes are released. This is the ordinary operation of devices of this character. Pivoted to the arm is a vertically-movable handle, the inner end of which is connected to a reciprocating rod, which is adapted to operate a valve whereby compressed air may be directed in either of two directions.

The invention also consists in the further novel construction and combination of parts hereinafter fully described and claimed, and illustrated in the accompanying drawings, showing the preferred form of my invention, and in which—

Figure 1 is a side elevation of my improved operating-handle connected to an ordinary air-brake valve. Fig. 2 is a top plan view thereof. Fig. 3 is a side elevation of the upper portion of the reciprocating rod detached. Fig. 4 is an elevation of the connecting-spring. Fig. 5 is a side elevation of a modified form of operating-handle connected to a valve and showing one method of utilizing the reciprocating rod for the purpose of directing compressed air to different points, and Fig. 6 is a side elevation of another modified form of operating-handle.

Referring to the figures by numerals of reference, 1 is an air-brake valve of any ordinary construction, such as is used upon electric cars, and this valve has an annular flange 2 at its upper end and a tubular stem 3. Extending laterally from this stem and revoluble therewith is an arm 4, having parallel ears 5 projecting upward from its free end, while an L-shaped extension 6 extends downward from said end and engages the flange 2. A reciprocating rod 7 is mounted within the stem 3 and has a recess 8 in one side thereof, which is adapted to receive a pin 9, extending transversely between parallel ears 10. These ears are arranged at one end of the inverted-U-shaped spring-strip 11, the other end of which is secured to one end of a handle 12. This handle is pivoted at a point between its ends upon a pin 13, connecting the ears 5.

In Fig. 5 I have shown a modified form of handle in which all of the parts are substantially similar to those disclosed in Fig. 1, with the exception of the strip 14, which is rounded instead of U-shaped.

In Fig. 6 the handle 15 is shown provided with an angular upwardly-projecting extension 16, to the end of which is pivoted a link 17, which engages the rod 7. This link is held normally in engagement with the rod by means of a coiled spring 18, which is secured at opposite ends to the link and to the extension 16, respectively.

In Fig. 5 I have shown one method of utilizing the rod 7 for directing compressed air to different sources. By referring to this figure it will be seen that 19 is an air-inlet pipe and 20 and 21 air-outlet pipes. These pipes are those ordinarily used in connection with the valve 1, and by turning the arm 4 the compressed air admitted through pipe 19 is directed by the usual valve mechanism into either one of the pipes 20 and 21. The lower end of rod 7 is swiveled within the upper end of a slide-valve 22, having a passage 23 therein which is adapted to register with either of two passages 24 and 25, respectively, which extend through a valve-casing 26. These passages 24 and 25 communicate with the inlet-pipe 19, and one of them, 24, extends to a whistle 27, while the other one extends to any suitable point, such as a sand-box. (Not shown.)

With the construction illustrated in Fig. 5 it will be seen that by pressing downward on the handle 12 the rod 7 is thrown upward by the strip 14, and passage 23 is caused to register with passage 24, while passage 25 is closed. Compressed air will thus be directed to the whistle 27. At the same time, if desired, the brake may be applied by turning the handle 12 and arm 4 in the proper direction. By swinging the handle 12 upward the air from pipe 19 may be directed into a pipe 28, extending from passage 25, and the current to the whistle 27 is thus shut off. The valve 22 and the adjoining parts thereof can be located in any desired relation to valve 1 either inside or outside of it.

It will be seen that any one of the four applications of power is permissible where a handle such as herein described is employed, and either lateral movement of the handle 12 and the arm 4 can be combined with either of the vertical movements of said handle.

In the foregoing description I have shown the preferred form of my invention; but I am aware that modifications may be made therein without departing from the spirit or sacrificing any of the advantages thereof, and I therefore reserve the right to make such changes as fall within the scope of my invention.

Having thus described the invention, what is claimed as new is—

1. The combination with a valve having an annular flange thereon, of a revoluble valve-stem, an arm connected thereto and engaging the flange, ears upon the arm, a reciprocating rod, a handle pivoted at a point intermediate its ends between the ears, and means connecting said handle with the rod, the handle and arm being adapted to move in a plane at right angles to each other.

2. The combination with a valve having an annular flange thereon, and a revoluble stem, of an arm secured to and movable with the stem, an angular extension upon the arm engaging the flange, ears upon the arm, a handle pivoted between the ears and adapted to swing in a plane at right angles to the plane of movement of the arm, a reciprocating rod, and connecting means secured to the rod and handle.

3. The combination with a valve having an annular flange thereon, and a revoluble stem, of an arm secured to and movable with the stem, an angular extension upon the arm and engaging the flange, ears upon the arm, a handle pivoted between the ears and adapted to swing in a plane at right angles to the plane of movement of the arm, a reciprocating rod, and a spring-strip secured at opposite ends to the handle and rod.

4. The combination with a valve having an annular flange thereon, and a revoluble stem, of an arm secured to and movable with the stem, an angular extension upon the arm engaging the flange, ears upon the arm, a handle pivoted between the ears and adapted to swing in a plane at right angles to the plane of movement of the arm, a reciprocating rod, and connecting means secured to the handle and detachably secured to the rod.

5. The combination with a valve having air inlet and outlets, a slide-valve, and a valve-casing therefor having inlets and outlets; of a revoluble reciprocating rod connected to the slide-valve, a revoluble arm upon the first-named valve, a handle pivoted thereto and adapted to swing in a plane at right angles to the plane of movement of the arm, and connecting means secured to said handle and reciprocating rod.

6. In a device of the class described, a valve, a rotary stem therefor, a handle pivotally connected with and adapted for rotating said stem, a reciprocatory stem, and operative connections between the handle and last-named stem for reciprocating the latter.

7. In a device of the class described, a valve, a rotary valve-stem, an arm connected to the stem and movable therewith, interengaging devices on the valve and stem for guiding the latter in its movements, a reciprocatory valve-stem, a handle pivotally connected with the arm for rotating the latter and the rotary stem, and operative connections between the handle and reciprocatory stem for operating the latter.

In testimony whereof I affix my signature in presence of two witnesses.

WALLACE W. FULLER.

Witnesses:
   T. MEULLUC THOREECEN,
   WM. AUSTIN.